T861034

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 15, 1969

861 O.G. 705

765,985

CONTROL OF PROCESSING PROBLEMS RELATED TO ADDITIVES BY COMPOSITE EXTRUSION

Louis F. Erb, Nixon, N.J., assignor to Hercules Incorporated, Wilmington, Del., a corporation of Delaware

Filed Oct. 8, 1968. Published Apr. 15, 1969

Class 264—171

No Drawing. 4 Pages Specification

A novel technique for preparing films of synthetic polymers containing additives comprises extruding the film as a three-layer composite having substantially all of the additives in the center or core layer. The method is particularly useful in cases where the additives has a tendency to escape from the polymer as, for example, by volatilization during extrusion or due to incompatibility with the polymer so that it is deposited on processing equipment during film production. The technique is particularly useful in the addition of such additives as plasticizers, slip agents, and antistatic compounds to polyolefin films.